USO10445281B2

(12) United States Patent
Trichy

(10) Patent No.: US 10,445,281 B2
(45) Date of Patent: Oct. 15, 2019

(54) LOAD DETECTION APPARATUS AND METHOD FOR USB SYSTEMS

(71) Applicant: Active-Semi (BVI) Inc., Allen, TX (US)

(72) Inventor: Narasimhan Trichy, Plano, TX (US)

(73) Assignee: Active-Semi (BVI) Inc., Allen, TX (US)

(*) Notice: Subject to any disclaimer, the term of this patent is extended or adjusted under 35 U.S.C. 154(b) by 425 days.

(21) Appl. No.: 15/133,882

(22) Filed: Apr. 20, 2016

(65) Prior Publication Data

US 2017/0308152 A1   Oct. 26, 2017

(51) Int. Cl.
*G06F 1/26* (2006.01)
*G06F 13/40* (2006.01)
*G06F 13/42* (2006.01)
*G06F 1/3215* (2019.01)
*G06F 1/3234* (2019.01)

(52) U.S. Cl.
CPC ........ *G06F 13/4081* (2013.01); *G06F 1/3215* (2013.01); *G06F 1/3234* (2013.01); *G06F 13/4022* (2013.01); *G06F 13/4282* (2013.01)

(58) Field of Classification Search
None
See application file for complete search history.

(56) References Cited

U.S. PATENT DOCUMENTS

| 6,400,045 | B1* | 6/2002 | Hosokawa | G06F 1/20 307/117 |
| 2006/0181241 | A1* | 8/2006 | Veselic | G06F 1/266 320/107 |
| 2011/0085354 | A1* | 4/2011 | Wang | H02M 1/4225 363/21.02 |
| 2014/0361738 | A1* | 12/2014 | Lee | H02J 5/005 320/108 |
| 2015/0285872 | A1* | 10/2015 | Chung | H02M 1/15 324/764.01 |
| 2016/0226298 | A1* | 8/2016 | Shimokawa | H02J 50/40 |
| 2017/0187200 | A1* | 6/2017 | Somerville | H02J 7/0052 |

* cited by examiner

*Primary Examiner* — Ilwoo Park
(74) *Attorney, Agent, or Firm* — Withrow & Terranova, P.L.L.C.

(57) ABSTRACT

An apparatus comprises a positive data input/output terminal configured to be connected with a positive data line of a USB device, wherein the positive data input/output port is weakly pulled up to a first voltage potential through a pull-up resistor, a negative data input/output terminal configured to be connected with a negative data line of the USB device, wherein the negative data input/output terminal is connected to a second voltage potential, a window comparator having an input detecting a voltage across the two data input/output terminals and a wake-up signal generator connected to an output of the window comparator, wherein the wake-up signal generator is configured to generate a signal for adjusting a switching frequency of a power converter after the USB device is connected to the power converter.

19 Claims, 6 Drawing Sheets

LOAD DETECTION APPARATUS AND METHOD FOR USB SYSTEMS

TECHNICAL FIELD

The present disclosure relates to a load detection apparatus for a universal serial bus (USB) system.

BACKGROUND

As technologies further advance, a variety of portable devices, such as mobile phones, tablet PCs, digital cameras, MP3 players and/or the like are powered by a power source having a USB port. The portable devices receive power from the power source through a USB cable inserted into the USB port.

The power source may be a wall adapter having the USB port. The wall adapter converts power from an alternating current (hereinafter "ac") power supply to a regulated direct current (hereinafter "dc") voltage. The wall adapter may include an electromagnetic interference filter (EMI) filter, a diode rectifier, an isolated dc/dc converter and the USB port providing an interface between the wall adapter and the USB cable.

The EMI filter of the wall adapter is used to suppress conducted EMI noise from the ac power supply. Two input terminals of the diode rectifier are connected directly to the two output terminals of the EMI filter. The diode rectifier is able to convert the input ac waveform to a pulsating dc waveform at the output terminals of the diode rectifier. A plurality of capacitors may be coupled between the two output terminals of the diode rectifier. The capacitors are used to attenuate the ripple of the pulsating dc waveform.

The isolated dc/dc converter may be implemented as a flyback converter. The flyback converter is derived from buck-boost topology. The flyback converter may be formed by a transformer, a switch, a diode and a plurality of output capacitors. The primary side of the transformer is connected in series with the switch. The secondary side of the transformer is connected in series with the diode. The transformer provides a voltage ratio from input to output. In addition, the transformer provides isolation. Furthermore, the flyback converter's transformer functions as a pair of coupled inductors for storing energy. When the switch is turned on, energy is stored in the winding of the transformer. The polarity dots of the transformer and the diode are arranged such that there is no energy transferred to the secondary side when the switch is on. The load current is maintained by the plurality of output capacitors. On the other hand, when the switch is turned off, the polarity of the transformer reverses. As a result, the output rectifier conducts and the energy stored in the transformer is transferred to the load as well as the output capacitors.

SUMMARY OF THE INVENTION

These and other problems are generally solved or circumvented, and technical advantages are generally achieved, by preferred embodiments of the present invention which in some embodiments may improve the response time of a power system including a USB port.

In accordance with an embodiment, a system comprises an isolated power converter comprising a primary switching network, a transformer and a secondary switching network, a primary controller configured to adjust a switching frequency of the primary switching network in response to a load change and a secondary controller comprising a load detection apparatus, wherein a positive data input/output terminal and a negative data input/output terminal of the secondary controller are configured to be connected with two data lines of a universal serial bus (USB) device respectively and the load detection apparatus is configured to detect a voltage change across the positive data input/output terminal and the negative data input/output terminal, and generate a wake-up signal based upon the voltage change.

In accordance with another embodiment, an apparatus comprises a positive data input/output terminal of a USB port configured to be connected with a positive data line of a USB device, wherein the positive data input/output terminal is weakly pulled up to a first voltage potential through a pull-up resistor, a negative data input/output terminal of the USB port configured to be connected with a negative data line of the USB device, wherein the negative data input/output terminal is connected to a second voltage potential, a window comparator having an input detecting a voltage across the positive data input/output terminal and the negative data input/output terminal, wherein the first voltage potential is less than an upper threshold of the window comparator and greater than a lower threshold of the window comparator and a wake-up signal generator connected to an output of the window comparator, wherein the wake-up signal generator is configured to generate a signal for adjusting a switching frequency of a power converter after the USB device is plugged into the USB port.

In accordance with yet another embodiment, a method comprises detecting a plug-in event through monitoring a voltage change across a positive data input/output terminal and a negative data input/output terminal of a USB port, wherein the positive data input/output terminal and the negative data input/output terminal are configured to be connected with a positive data line and a negative data line of a USB device respectively, comparing a detected signal with an upper threshold and a lower threshold of a window comparator, generating a wake-up signal based upon a comparison result of the step of comparing the detected signal and increasing a switching frequency of a power converter by applying the wake-up signal to the power converter.

An advantage of a preferred embodiment of the present invention is improving a USB power system's performance through adjusting the switching frequency of a power converter after detecting a plug-in event through detecting a voltage change on the data communication terminals of the USB power system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates a schematic diagram of the wake-up signal generator shown in

FIG. 2 in accordance with various embodiments of the present disclosure;

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of various disclosures.

The present disclosure will be described with respect to preferred embodiments in a specific context, namely a load detection apparatus for an ac/dc power system such as a wall adapter having a USB port. The disclosure may also be applied, however, to a variety of power systems with a USB port. For example, the disclosure may be applicable to a dc/dc power system having a USB port. Hereinafter, various embodiments will be explained in detail with reference to the accompanying drawings.

Figure 1:
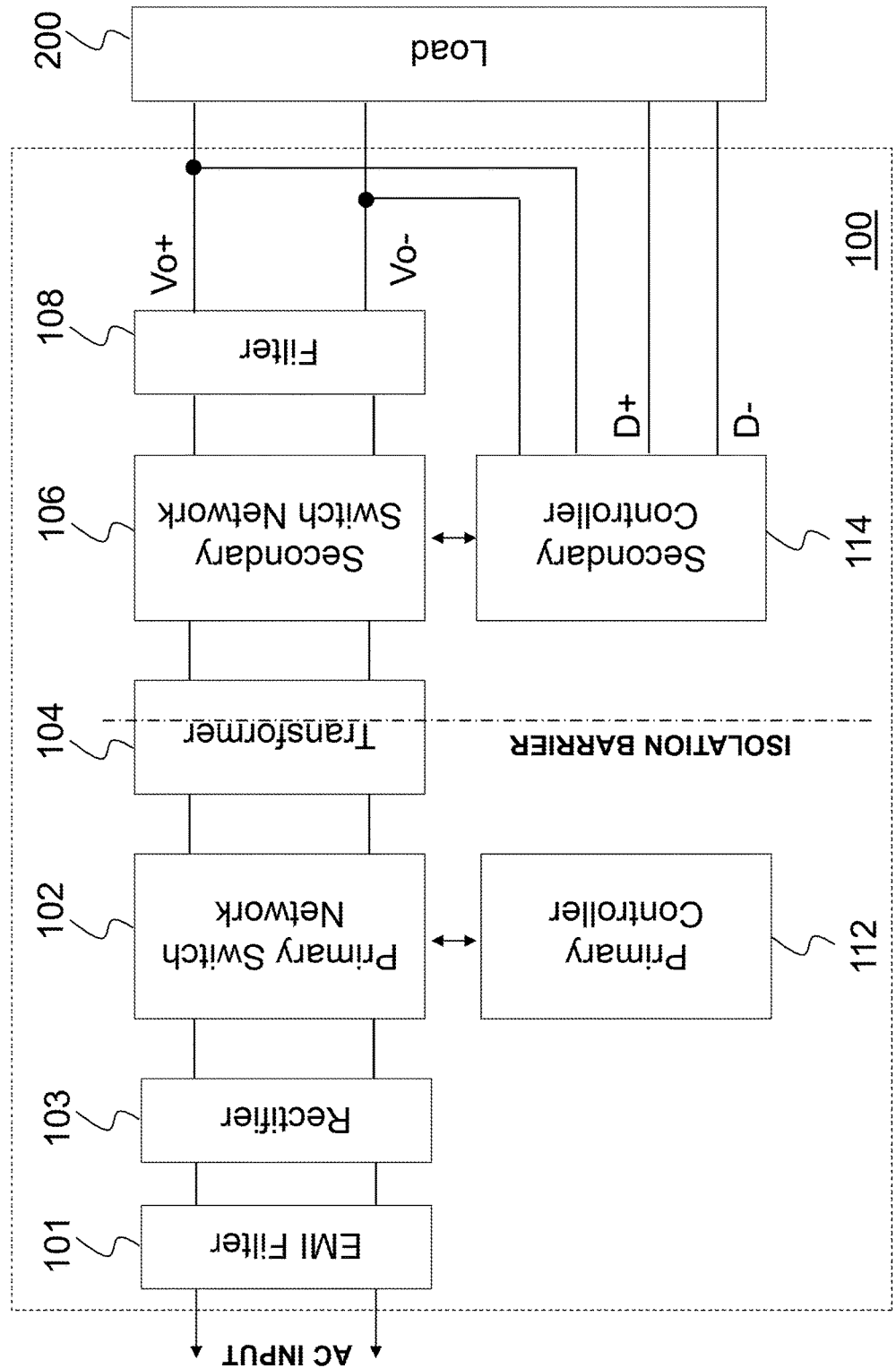
FIG. 1 illustrates a block diagram of a power system including a load detection apparatus in accordance with various embodiments of the present disclosure.

FIG. 1 illustrates a block diagram of a power system including a load detection apparatus in accordance with various embodiments of the present disclosure. The power system shown in FIG. 1 includes a power supply 100 and a load 200. In some embodiments, the power supply 100 is a wall adapter having a USB port. The power supply 100 may be implemented as a switched mode power supply. In particular, the power supply 100 may be implemented as a flyback power converter having the USB port. In alternative embodiments, the power supply 100 may be implemented as any other suitable power converters such as an ac/dc power converter, an isolated dc/dc power converter, a non-isolated dc/dc power converter, a linear regulator, any combinations thereof and the like. Throughout the description, the power supply 100 may be alternatively referred to as a power converter 100.

In some embodiments, the input of the power converter 100 is connected to an ac source, which supplies a utility line voltage to the power converter 100. Alternatively, the power converter 100 may be implemented as a dc/dc converter having an input connected to a renewable power source such as a solar panel array or an energy storage device such as rechargeable batteries, fuel cells and/or the like.

The power converter 100 comprises an electromagnetic interference filter (EMI) filter 101, a rectifier 103, a primary switch network 102, a transformer 104, a secondary switch network 106, an output filter 108, a primary controller 112 and a secondary controller 114. As shown in FIG. 1, the EMI filter 101, the rectifier 103, the primary switch network 102, the transformer 104, the secondary switch network 106 and the output filter 108 are coupled to each other and connected in cascade between the input ac power source and the load 200. The primary controller 112 is coupled to the primary switching network 102. The secondary controller 114 is coupled to the secondary switch network 106. In addition, the secondary controller 114 includes a USB port providing an interface between the power converter 100 and the load 200.

The input ac power source provides an ac voltage in a universal range from 90V to 264V. The EMI filter 101 is used to prevent conducted EMI from penetrating into the power converter 100. The rectifier 103 is coupled to the output of the EMI filter 101. The rectifier 103 may be implemented as a diode bridge providing full-wave rectification from the ac input waveform. The detailed operations and structures of the EMI filter 101 and the rectifier 103 are well known in the art, and hence are not discussed herein.

The primary switch network 102 may comprise primary side switching elements (e.g., switches and diodes) of a flyback converter according to some embodiments. Alternatively, the primary switch network 102 may be of the primary side switches of other bridge converters such as a full-bridge converter, a half-bridge converter, a push-pull resonant converter and the like.

According to some embodiments, the switch of the primary switch network 102 is implemented as metal oxide semiconductor field effect transistor (MOSFET) or MOSFETs connected in parallel. Furthermore, the switch of the primary switch network 102 may be formed by other types of controllable devices such as bipolar junction transistor (BJT) devices, super junction transistor (SJT) devices, insulated gate bipolar transistor (IGBT) devices, gallium nitride (GaN) based power devices and/or the like.

Furthermore, the primary switch network 102 may comprise switching elements and auxiliary resonant components of various resonant converters when the power converter 100 is implemented as a resonant dc/dc converter. The resonant converters may be implemented in a variety of ways. For example, the resonant converters may comprise a series resonant inductor, a parallel resonant inductor and a series resonant capacitor. In some embodiments, the power converter 100 may be implemented as an LLC resonant converter having a resonant tank. The resonant tank includes three key resonant elements, namely the series resonant inductor, the series resonant capacitor and the parallel resonant inductor. These three resonant elements determine the resonant frequency of the resonant converter. The power converter 100 may operate at a frequency approximately equal to the resonant frequency of the resonant tank. As a result, the power converter 100 is able to achieve zero voltage switching for the primary side switching elements and zero current switching for the secondary side switching elements.

The transformer 104 provides electrical isolation between the primary side and the secondary side of the power converter 100. In accordance with an embodiment, the transformer 104 may be formed of two transformer windings, namely a primary transformer winding and a secondary transformer winding. Alternatively, the transformer 104 may have a center tapped secondary so as to have three transformer windings including a primary transformer winding, a first secondary transformer winding and a second secondary transformer winding.

It should be noted that the transformers described above and throughout the description are merely examples, which should not unduly limit the scope of the claims. One of ordinary skill in the art would recognize many variations, alternatives, and modifications. For example, the transformer 104 may further comprise a variety of bias windings and gate drive auxiliary windings.

The secondary switch network 106 may comprise a diode connected in series with the secondary winding of the transformer 104. Alternatively, when the power converter 100 is implemented as a dc/dc converter such as a bridge converter and the transformer 104 is of a center tapped secondary, the secondary switch network may be formed of a pair of switching elements such as n-type metal oxide semiconductor (NMOS) transistors. On the other hand, when the transformer 104 is of a single secondary winding, the secondary switch network 106 may be a full-bridge rectifier coupled to the single secondary winding of the transformer 104.

It should be noted that while the secondary switch network may be implemented as a diode, other suitable switching elements such as a synchronous rectifier, may alternatively be used.

The output filter 108 is used to attenuate the switching ripple of the power converter 100. In some embodiments, the output filter 108 may be a plurality of capacitors coupled between the outputs of the secondary switch network 106. Alternatively, the output filter 108 may be an L-C filter formed by an inductor and a plurality of capacitors. One person skilled in the art will recognize that some converter topologies such as forward converters may require an L-C filter. On the other hand, some isolated power converter topologies such as flyback converters may include an output filter formed by a capacitor or a plurality of capacitors connected in parallel. One person skilled in the art will further recognize that different output filter configurations apply to different power converter topologies as appropriate. The configuration variations of the output filter 108 are within various embodiments of the present disclosure.

The primary controller 112 may be implemented by a pulse-width modulation (PWM) controller, a microcontroller, or any other controllers. One of ordinary skill in the art would recognize many variations, alternatives, and modifications for implementing the primary controller 112. In some embodiments, the power converter 100 has at least two operating modes. In a normal operation mode, the primary controller 112 controls the operation of the primary switch network so that the power converter 100 operates a higher switching frequency ranging from 50 KHz to 150 KHz.

In order to reduce the standby power of the power converter 100, the primary controller may reduce the switching frequency of the power converter 100 to a level approximately equal to 400 Hz. In other words, the primary controller 112 generates a PWM pulse every 2.5 milliseconds.

The secondary controller 114 is placed on the secondary side of the power converter 100. The secondary controller 114 comprises all necessary function units of a typical secondary controller, which is well known in the art. In addition, the secondary controller 114 includes a USB port. As shown in FIG. 1, the USB port of the secondary controller 114 includes four terminals, namely a positive data input/output terminal D+, a negative data input/output terminal D−, a positive power terminal Vo+ and a negative power terminal Vo−. Two data terminals D+ and D− are used for transferring data signals. Two power terminals Vo+ and Vo− are used for supplying electric power to the load 200.

As shown in FIG. 1, the primary controller 112 and the secondary controller 114 are separated by the isolation barrier provided by the transformer 104. The primary controller 112 and the secondary controller 114 may communicate with each other through suitable means such as an opto-coupler, a capacitive link, an isolated magnetic link and the like.

The load 200 may be a consumer electronics device such as a mobile phone and the like. The mobile phone is connected to the USB port of the power converter 100 through a USB cable. When the USB cable is plugged into the USB port of the power converter 100, a current surge as well as a voltage drop may occur at the data terminals D+ and D−. The voltage drop on the data terminal D+ may be used to detect such a plug-in event. The detailed circuit and operation principle of a load detection apparatus will be described below with respect to FIGS. 2-6.

Figure 2:
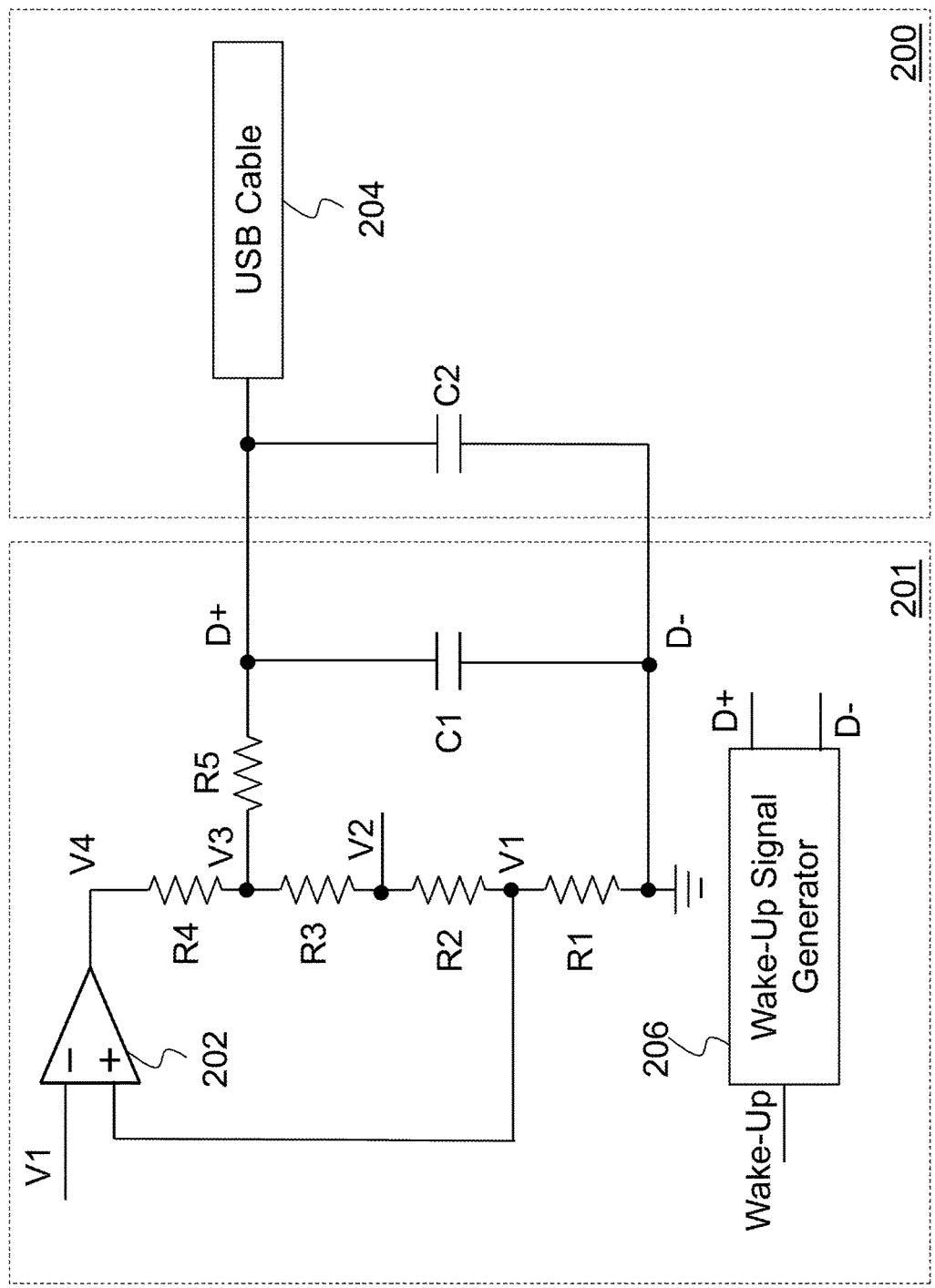
FIG. 2 illustrates a schematic diagram of an implementation of the load detection apparatus in accordance with various embodiments of the present disclosure.

FIG. 2 illustrates a schematic diagram of an implementation of the load detection apparatus in accordance with various embodiments of the present disclosure. In some embodiments, the load detection apparatus 201 shown in FIG. 2 may be part of the secondary controller 114. In alternative embodiments, the load detection apparatus 201 may be implemented as a separate integrated circuit. As shown in FIG. 2, the load detection apparatus 201 comprises an amplifier 202, a plurality of resistors for establishing various reference voltages and a wake-up signal generator 206.

As shown in FIG. 2, resistors R1, R2, R3 and R4 are connected in series between the output of the amplifier 202 and ground. The amplifier 202 has an inverting input connected to a predetermined reference voltage V1. The non-inverting input of the amplifier 202 is connected to a common node of the resistor R1 and the resistor R2. According to the operating principle of amplifiers, the voltage at the common node of R1 and R2 is equal to V1.

Resistors R1, R2, R3 and R4 form a divider. In some embodiments, R1, R2, R3 and R4 have a resistance value ranging from 10 kilo-ohms to 50 kilo-ohms. By selecting suitable resistance values of R1, R2, R3 and R4, reference voltages V1, V2, V3 and V4 can be established accordingly.

In some embodiments, V1 is equal to 1.28V; V2 is equal to 2.6V; V3 is equal to 2.8V; V4 is equal to 3.0V. It should be noted that the reference voltages above are merely examples. These reference voltages are selected purely for demonstration purposes and are not intended to limit the various embodiments of the present disclosure.

The resistor R5 is connected between the common node of R3 and R4, and the positive data input/output terminal D+. R5 functions as a pull-up resistor. In some embodiments, R5 is approximately equal to 500 kilo-ohms. As shown in FIG. 2, the negative data input/output terminal D− is directly connected to ground. There may be a capacitor C1 connected between D+ and D−. In some embodiments, C1 is approximately equal to 1 pF.

The voltage on the positive data input/output terminal D+ can maintain a predetermined voltage level when no loading is on the data input/output terminals D+ and D−. Since the positive data input/output terminal D+ is weakly pulled up through the resistor R5, the positive data input/output terminal D+ may be overdriven easily. In other words, the voltage on the positive data input/output terminal D+ is sensitive to any plug-in events because the uncharged capacitor of the plugged-in device demands as much current as is available. Such a sudden load current surge may cause a voltage drop on the positive data input/output terminal D+.

The load 200 may be a USB device having a long cable 204. Such a long cable 204 may lead to a parasitic capacitance between the positive data line and the negative data line of the load 200. The parasitic capacitance is represented as C2 in FIG. 2. In some embodiments, C2 is approximately equal to 1 pF.

In operation, when the USB device is first plugged into the USB port of the power converter 100, a current will flow from capacitor C1 to capacitor C2. Since the positive data input/output terminal D+ is weakly pulled up to V3, the current will cause a voltage drop at the positive data input/output terminal D+. The wake-up signal generator 206 may be employed to detect the voltage drop on the positive data input/output terminal D+ so as to identify the plug-in event.

In response to the plug-in event, the wake-up signal generator 206 may generate a wake-up signal. In some embodiments, the wake-up signal may be used to activate a dummy load. The detailed operation principle of activating the dummy load will be described below with respect to FIG. 4. In alternative embodiments, the wake-up signal may be transferred across the isolation barrier of the power converter 100 and sent to the primary controller 112 of the power converter 100. After receiving the wake-up signal, the primary controller 112 may increase the switching frequency of the power converter 100 so that the power converter 100 is able to leave the power saving mode and enter the normal operation mode.

Without the load detection apparatus 201 shown in FIG. 2, the power converter 100 may keep operating in the power saving mode with a reduced switching frequency such as 400 Hz. As the switching frequency decreases, the load transient response also becomes slow. Such a slow response in response to a sudden load change from the load 200 may cause the output voltage of the power converter 100 to deviate from its desired value because the power converter 100 is not able to quickly enough to adjust its duty cycle so as to satisfy the sudden load change.

One advantageous feature of having the load detection apparatus 201 shown in FIG. 2 is the performance of the power converter is improved by adjusting the switching frequency of the power converter in response to a plug-in event. The increased switching frequency helps to improve the response time of the power converter when a USB device is first plugged into the USB port of the power converter.

Figure 3:
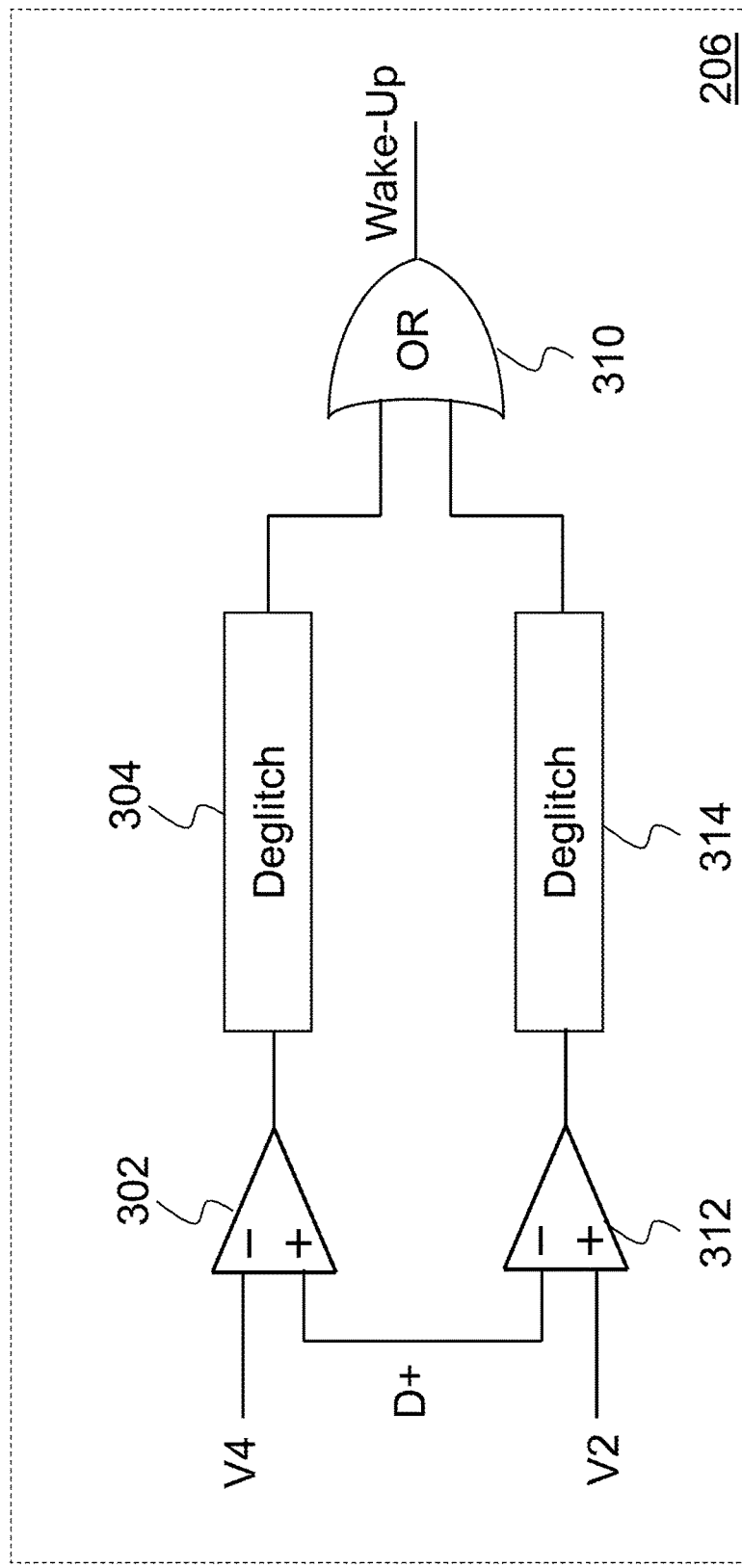

FIG. 3 illustrates a schematic diagram of the wake-up signal generator shown in FIG. 2 in accordance with various embodiments of the present disclosure. The wake-up signal generator 206 may be implemented as a window comparator. The window comparator comprises a first comparator 302, a second comparator 312, a first deglitch circuit 304, a second deglitch circuit 314 and an OR gate 310.

The inverting input of the first comparator 302 is connected to the reference voltage V4 (also shown in FIG. 2). The non-inverting input of the first comparator 302 is connected to the positive data input/output terminal D+. The inverting input of the second comparator 312 is connected to the non-inverting input of the first comparator 302. The non-inverting input of the second comparator 312 is connected to the reference voltage V2 (also shown in FIG. 2).

The first deglitch circuit 304 is connected to the output of the first comparator 302. The second deglitch circuit 314 is connected to the output of the second comparator 312. The structure and operating principle of deglitch circuits are well known, and hence are not discussed in detail herein.

The OR gate 310 has a first input connected to the output of the first deglitch circuit 304 and a second input connected to the output of the second deglitch circuit 314. The OR gate 310 is configured to generate a wake-up signal in response a voltage change on the positive data input/output terminal D+. In particular, V2 and V4 function as the lower threshold and upper threshold of the window comparator respectively. When the voltage on the positive data input/output terminal D+ is either greater than V4 or less than V2, a wake-up signal is generated at the output of the OR gate 310. In response to the wake-up signal, the power converter 100 may activate a dummy load placed at the secondary side of the power converter 100. The dummy load helps the power converter leave the power saving mode and enter into the normal operation mode. On the other hand, the wake-up signal may be transferred across the isolation barrier and sent to the primary controller. After receiving the wake-up signal, the primary controller increases the switching frequency of the power converter from a lower switching frequency (e.g., 400 Hz) to a higher switching frequency (e.g., 100 KHz).

It should be noted that the input of the window comparator is connected to the positive data input/output terminal D+. It is merely an example. In alternative embodiments, the voltage difference of the data input terminals D+ and D− may be fed into the input of the window comparator. Furthermore, other suitable data communication buses of the USB port may be connected to the input of the window comparator. The window comparator detects the voltage change on one or a plurality of data communication buses after a USB device is plugged into the USB port. Based upon the voltage change such as a voltage drop, the window comparator generates a wake-up signal accordingly.

Figure 4:
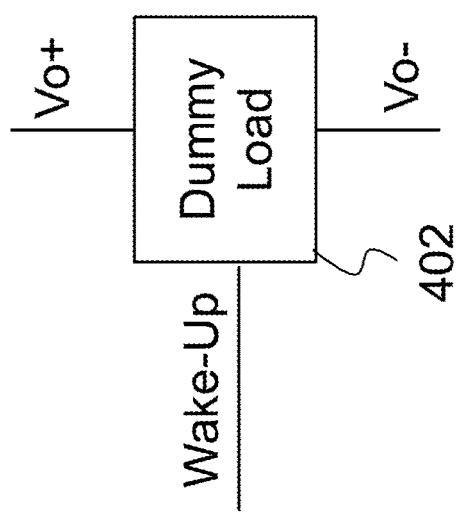
FIG. 4 illustrates a block diagram of a dummy load in accordance with various embodiments of the present disclosure.

FIG. 4 illustrates a block diagram of a dummy load in accordance with various embodiments of the present disclosure. A dummy load 402 may be connected between two terminals Vo+ and Vo− of the output filter 108. The dummy load 402 may be implemented as a resistor and a controllable switch connected in series. The resistor is selected such that the dummy load is in a range from 10 mA to 100 mA. In some embodiments, the dummy load is equal to 50 mA. By controlling the on-time of the controllable switch, the on time of the dummy load can be controlled accordingly. In some embodiments, the dummy load 402 is configured to be activated for a short duration after the wake-up signal occurs. The short duration is in a range from about 100 milliseconds to about 400 milliseconds.

The dummy load 402 is applied to the secondary side of the power converter 100. The dummy load 402 helps to keep the power converter 100 to be stable and operate at a higher frequency. Such a higher frequency helps the power converter 100 react much faster to any surge in load. As a result, the output voltage of the power converter 100 is maintained with its desired range.

Figure 5:
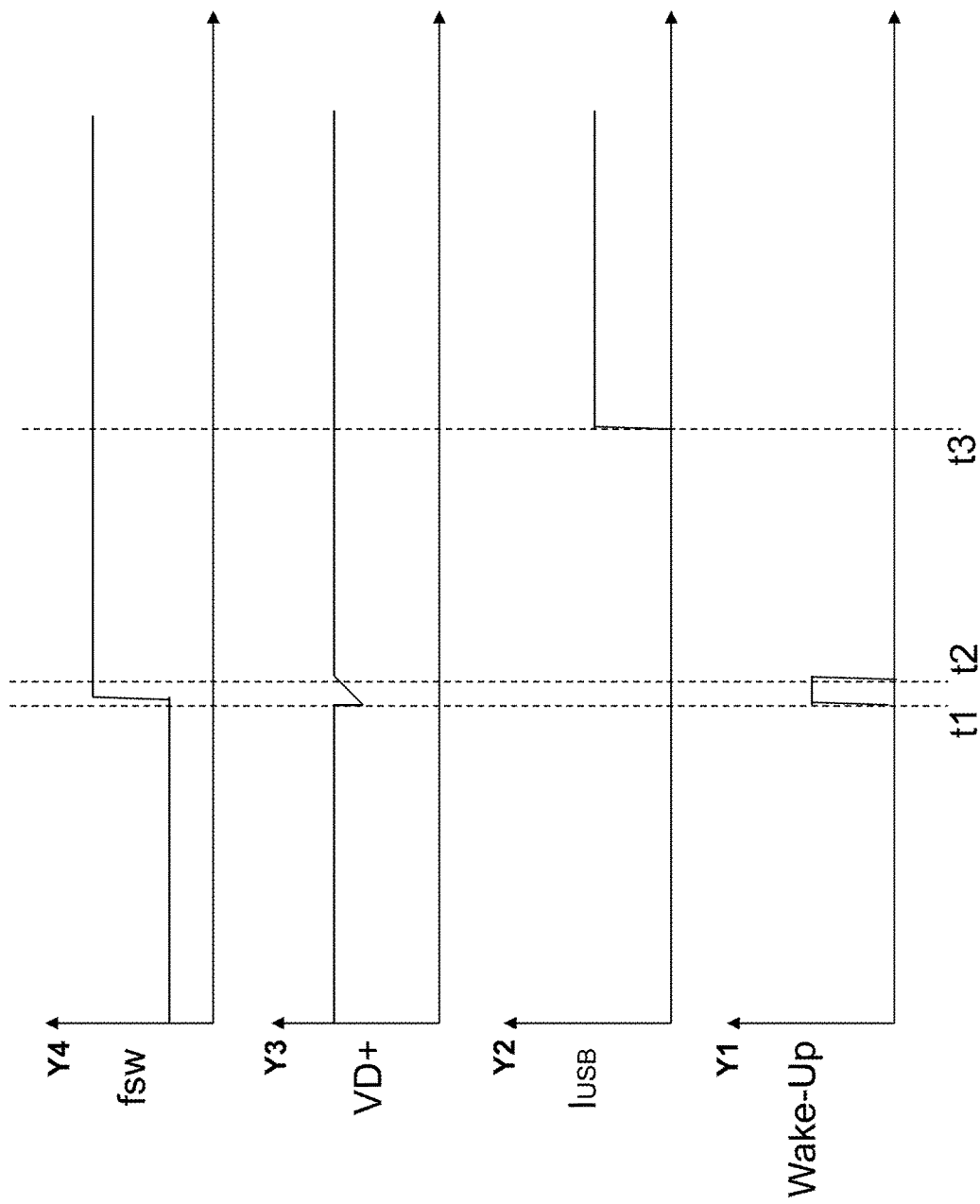
FIG. 5 illustrates a timing diagram of a first implementation of a load detection control mechanism in accordance with various embodiments of the present disclosure.

FIG. 5 illustrates a timing diagram of a first implementation of a load detection control mechanism in accordance with various embodiments of the present disclosure. The horizontal axis of FIG. 5 represents intervals of time. There are four vertical axes. The first vertical axis Y1 represents the wake-up signal generated from the wake-up signal generator shown in FIG. 3. The second vertical axis Y2 represents the current flowing through the USB device plugged into the USB port. The third vertical axis Y3 represents the voltage on the positive data input/output terminal D+. The fourth vertical axis Y4 represents the switching frequency of the power converter 100.

Before a USB device is plugged into the power converter 100, the power converter 100 operates in a power saving mode. As a result, the switching frequency fsw is low (e.g., 400 Hz). The voltage on the positive data input/output terminal VD+ is maintained at its desired voltage (e.g., 2.6V).

At t1, the USB device is plugged into the USB port of the power converter 100. The uncharged parasitic capacitance of the USB cable pulls down the voltage on the positive data input/output terminal VD+. The load detection apparatus 201 detects the voltage drop on the positive data input/output terminal VD+ and generates a wake-up signal. The duration of the wake-up signal is from t1 to t2 as shown in FIG. 5.

In response to the wake-up signal, a dummy load may be activated. The dummy load increases the load of the power converter 100 to a level approximately equal to 50 mA. Such a load is able to help the power converter 100 leave the power saving mode and enter the normal operation mode. As a result, at a time between t1 and t2, the switching frequency fsw of the power converter 100 is increased from a lower switching frequency (e.g., 400 Hz) to a higher switching frequency (e.g., 100 KHz). After a time period (e.g., 40 milliseconds), the power converter 100 allows the current flowing into the USB device.

It should be noted that activating a dummy load is merely an example. The information of the plug-in event may be sent to the primary controller through transferring the wake-up signal across an isolation barrier of the power converter 100. After receiving the wake-up signal, the primary controller increases the switching frequency of the power converter accordingly.

Figure 6:
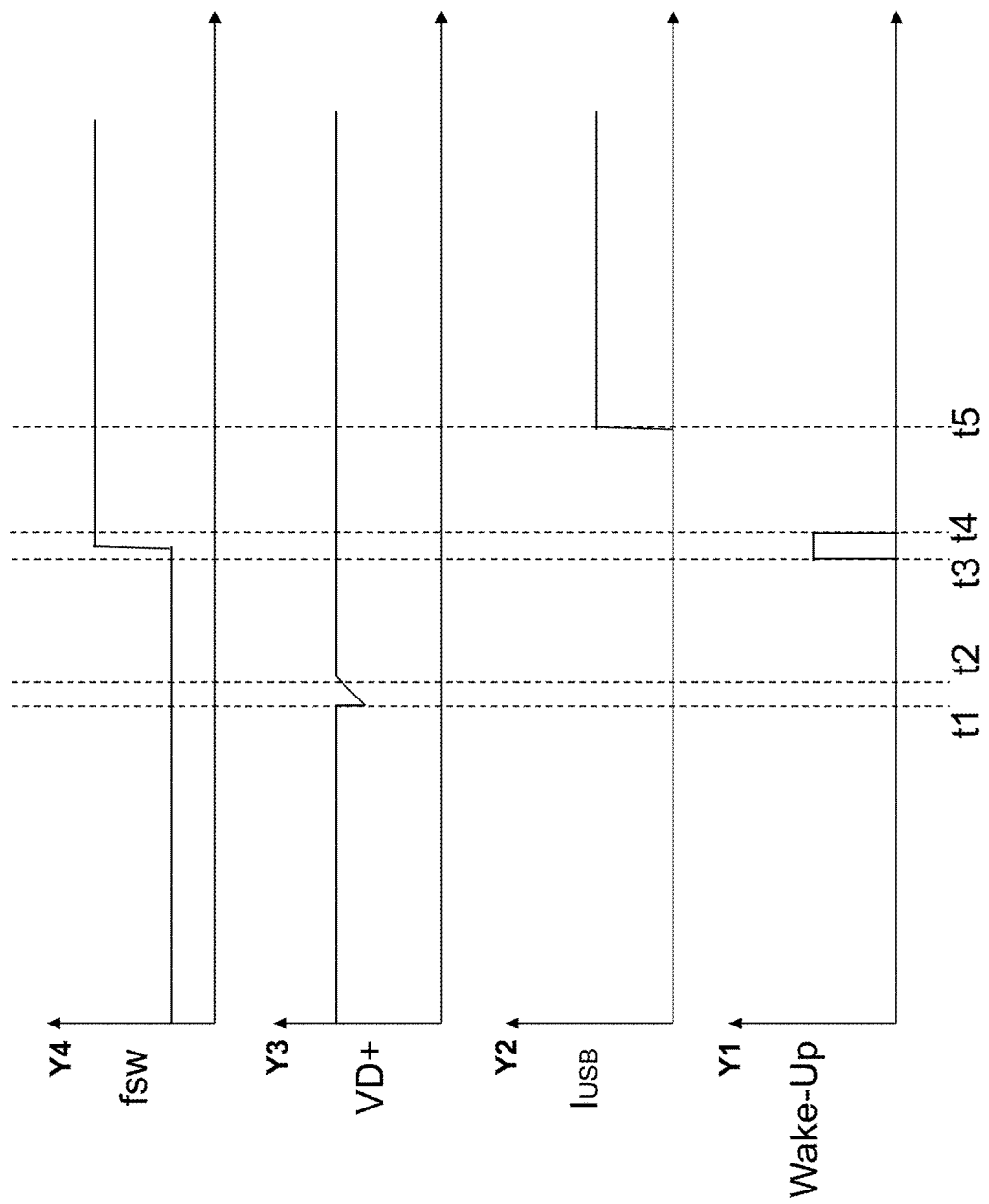
FIG. 6 illustrates a timing diagram of a second implementation of a load detection control mechanism in accordance with various embodiments of the present disclosure.

FIG. 6 illustrates a timing diagram of a second implementation of a load detection control mechanism in accordance with various embodiments of the present disclosure. At t1, the USB device is plugged in to the power converter 100. There may be a voltage drop on the positive data input/output terminal VD+ as shown in FIG. 6. The load detection apparatus fails to detect the voltage drop. Before allowing a charge current from the power converter 100 to the USB device, the power converter 100 is able to communicate with the USB device through the secondary controller during the time period from t2 to t3. In particular, the USB device may initiate a handshake with the power converter 100 through the data input/output terminals D+ and D−. After receiving the handshake from the USB device, the power converter 100 generates a wake-up signal at t3. The duration of the wake-up signal is from t3 to t4 as shown in FIG. 6.

In response to the wake-up signal, the switching frequency of the power converter 100 is increased from a lower frequency (e.g., 400 Hz) to a higher frequency (e.g., 100 KHz). Such a frequency increase helps to improve the load transient response of the power converter 100. At t5, after the power converter enters the normal operation mode, the charged current is allowed. As a result, the charge current increases from a level approximately equal to zero to a level required by the USB device.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A system comprising:
an isolated power converter comprising a primary switching network, a transformer and a secondary switching network;
a primary controller configured to adjust a switching frequency of the primary switching network in response to a load change; and
a secondary controller comprising a load detection apparatus, wherein:
a positive data input/output terminal and a negative data input/output terminal of the secondary controller are configured to be connected with two data lines of a universal serial bus (USB) device respectively, and wherein the positive data input/output terminal is weakly pulled up by a first voltage node of a voltage divider; and
the load detection apparatus is configured to detect a voltage change across the positive data input/output terminal and the negative data input/output terminal through comparing a voltage at the positive data input/output terminal with a first threshold and a second threshold, and generate a wake-up signal based upon the voltage change, wherein a load current of the isolated power converter is increased for a short duration, and wherein the first threshold and the second threshold are generated by a second voltage node and a third voltage node of the voltage divider respectively.

2. The system of claim 1, wherein the load detection apparatus comprises:
a plurality of voltage references and a window detector, and wherein the positive data input/output terminal is connected to a first voltage potential through a pull-up resistor and the window detector has two input terminals connected to a second voltage potential and a third voltage potential respectively, and wherein the first voltage potential is in a range between the second voltage potential and the third voltage potential.

3. The system of claim 2, wherein the load detection apparatus comprises:
a first amplifier having an inverting input connected to a voltage reference;
a first resistor, a second resistor, a third resistor and a fourth resistor connected in series between an output of the first amplifier and ground, and wherein a non-inverting input of the first amplifier is connected to a common node of the first resistor and the second resistor, and the positive data input/output terminal is connected to a common node of the third resistor and the fourth resistor through the pull-up resistor;

a first comparator having an inverting input connected to the output of the first amplifier and a non-inverting input receiving a signal equal to the voltage at the positive data input/output terminal; and a second comparator having an inverting input connected to the non-inverting input of the first comparator and a non-inverting input connected to a common node of the second resistor and the third resistor.

4. The system of claim 3, further comprising:
a first deglitch circuit connected to an output of the first comparator;
a second deglitch circuit connected to an output of the second comparator; and
an OR gate having a first input connected to an output of the first deglitch circuit and a second input connected to an output of the second deglitch circuit.

5. The system of claim 4, wherein:
an output of the OR gate is configured to generate the wake-up signal, and wherein the switching frequency of the primary switching network is increased from a lower switching frequency to a higher switching frequency in response to the wake-up signal.

6. The system of claim 1, wherein:
the secondary controller is configured to communicate with the USB device after the USB device is plugged into a USB port of the secondary controller.

7. The system of claim 1, wherein:
the isolated power converter is a flyback power converter.

8. The system of claim 1, further comprising:
an output filter connected to the secondary switching network; and
a dummy load connected to the output filter.

9. The system of claim 8, wherein:
the dummy load is configured to be activated for a short duration after the wake-up signal occurs.

10. The system of claim 9, wherein:
the short duration is in a range from about 100 milliseconds to about 400 milliseconds.

11. The system of claim 9, wherein:
the dummy load is about 50 mA.

12. An apparatus comprising:
a positive data input/output terminal of a USB port configured to be connected with a positive data line of a USB device, wherein the positive data input/output terminal is weakly pulled up to a first voltage potential through a pull-up resistor;
a negative data input/output terminal of the USB port configured to be connected with a negative data line of the USB device, wherein the negative data input/output terminal is connected to a second voltage potential;
a window comparator having an input detecting a voltage across the positive data input/output terminal and the negative data input/output terminal, wherein the first voltage potential is less than an upper threshold of the window comparator and greater than a lower threshold of the window comparator, and wherein the upper threshold, the first voltage potential and the lower threshold are generated by a single voltage divider having a plurality of resistors connected in series between an output of an amplifier and ground; and
a wake-up signal generator connected to an output of the window comparator, wherein the wake-up signal generator is configured to generate a signal for adjusting a switching frequency of a power converter after the USB device is plugged into the USB port.

13. The apparatus of claim 12, further comprising:
the amplifier having an inverting input connected to a voltage reference;
a first resistor, a second resistor, a third resistor and a fourth resistor connected in series between an output of the amplifier and ground, wherein a non-inverting input of the amplifier is connected to a common node of the first resistor and the second resistor, and the positive data input/output terminal is connected to a common node of the third resistor and the fourth resistor through the pull-up resistor;
a first comparator having an inverting input connected to the output of the amplifier and a non-inverting input connected to the positive data input/output terminal; and
a second comparator having an inverting input connected to the non-inverting input of the first comparator and a non-inverting input connected to a common node of the second resistor and the third resistor.

14. The apparatus of claim 13, further comprising:
a first deglitch circuit connected to an output of the first comparator;
a second deglitch circuit connected to an output of the second comparator; and
an OR gate having a first input connected to an output of the first deglitch circuit and a second input connected to an output of the second deglitch circuit, wherein an output of the OR gate is configured to generate a wake-up signal, and wherein the switching frequency of the power converter is increased from a lower switching frequency to a higher switching frequency in response to the wake-up signal.

15. A method comprising:
detecting a plug-in event through monitoring a voltage change across a positive data input/output terminal and a negative data input/output terminal of a USB port, wherein the positive data input/output terminal and the negative data input/output terminal are configured to be connected with a positive data line and a negative data line of a USB device respectively;
comparing a detected signal with an upper threshold and a lower threshold of a window comparator, wherein the upper threshold, the lower threshold and a voltage potential configured to pull up the positive data input/output terminal are generated by a same voltage divider having a plurality of resistors connected in series between an output of an amplifier and ground;
generating a wake-up signal based upon a comparison result of the step of comparing the detected signal; and
increasing a switching frequency of a power converter by applying the wake-up signal to the power converter, wherein a load current of the power converter is increased for a short duration due to the small load applied externally by the same wake-up signal.

16. The method of claim 15, further comprising:
adjusting the switching frequency of the power converter before providing a charge current to the USB device.

17. The method of claim 15, further comprising:
activating a dummy load coupled to a secondary side of the power converter after detecting the plug-in event.

18. The method of claim 17, further comprising:
in response to the plug-in event, activating the dummy load in a time duration ranging from 100 milliseconds to 400 milliseconds.

19. The method of claim 15, further comprising:
adjusting the switching frequency of the power converter through a primary controller of the power converter.

* * * * *